United States Patent [19]
Jiang

[11] Patent Number: 6,046,576
[45] Date of Patent: Apr. 4, 2000

[54] BOOST CONVERTER HAVING REDUCED OUTPUT VOLTAGE AND METHOD OF OPERATION THEREOF

[75] Inventor: Yimin Jiang, Plano, Tex.

[73] Assignee: Lucent Technologies Inc., Murray Hill, N.J.

[21] Appl. No.: 09/072,390

[22] Filed: May 4, 1998

[51] Int. Cl.[7] .............................. G05F 1/24; G05F 1/10; H02M 3/335

[52] U.S. Cl. ...................... 323/259; 323/222; 363/17; 363/56

[58] Field of Search .................... 323/259, 255, 323/222, 264, 266; 363/37, 127; 318/768, 769

[56] References Cited

U.S. PATENT DOCUMENTS 5,255,174  10/1993  Murugan ................................... 363/17
5,414,613  5/1995  Chen .......................................... 363/89
5,838,113  11/1998  Mihara .................................. 315/169.3

OTHER PUBLICATIONS

Da Feng Weng and S. Yuvarajan, "Resonant Boost Input Three Phase Power Factor Corrector," IEEE 1998, pp. 958–962, No Month Available.

*Primary Examiner*—Adolf Deneke Berhane
*Assistant Examiner*—Rajnikant B. Patel

[57] ABSTRACT

For use with a boost converter having a boost inductor couplable to a source of electrical power, a rectifier coupled to the boost inductor and a boost switch coupled across the rectifier, the boost converter operable in discontinuous mode, a circuit for, and method of, providing a reduced output voltage from the boost converter. In one embodiment, the circuit includes an autotransformer, coupled across an output of the boost converter, having an intermediate tap that provides a reduced output voltage at the output.

21 Claims, 1 Drawing Sheet

BOOST CONVERTER HAVING REDUCED OUTPUT VOLTAGE AND METHOD OF OPERATION THEREOF

TECHNICAL FIELD OF THE INVENTION

The present invention is directed, in general, to power conversion and, more specifically, to a three phase low input current total harmonic distortion (THD) boost converter having a reduced output voltage and a method of operating the same.

BACKGROUND OF THE INVENTION

Regulated DC power supplies are typically employed in analog and digital electronic systems. Two major categories of regulated DC power supplies are linear power supplies and switching power supplies. For reasons that will become more apparent, switching power supplies are generally the power supply of choice. In switching power supplies, transformation of a DC voltage from one level to another is often accomplished with a DC/DC converter, such as a step-down (buck) or step-up (boost) converter. Solid state devices, such as transistors, are operated as switches (either completely ON or completely OFF) within the switching converters. Since the power devices do not operate in the active region (as dictated in linear power supplies), the switching power supplies can achieve lower power dissipation in comparison to linear power supplies. Furthermore, the higher switching speeds and voltage and current ratings of the presently available power devices has further expanded the popularity of switching power supplies.

For applications that require three phase off-line rectification with low input current total harmonic distortion (THD), the simplest switching power converter topology is a single switch discontinuous current mode (DCM) boost converter. By operating the input inductors of the boost converter in DCM, at the beginning of each switching cycle, i.e., when the boost switch is ON, currents through the input inductors begin to ramp up from an initial value of zero at a rate proportional to the corresponding phase-to-neutral voltage of the input inductors. Consequently, the average input inductor currents, which are also the phase currents, are naturally proportional to the corresponding phase voltages when the boost switch is ON.

When the boost switch is OFF, an output voltage which is higher than the peak of the input phase-to-phase voltage (due to the operation of the boost converter) drives the currents through the input inductors to zero prior to the initiation of the next switching cycle. The rate of decrease of the current through each input inductor, however, is not proportional to the corresponding input phase-to-neutral voltage due to the participation of the output voltage. Thus, when the boost switch is OFF, the average input inductor currents, in this period, are not proportional to the corresponding phase-to-neutral voltages of the input inductors resulting in distortions in the input phase currents. It should be noted that for higher output voltages, the currents through the input inductors decrease at a faster rate thereby reducing distortions in the input currents.

Studies have shown that to achieve an input current THD of less than 10%, for instance, the output voltage of the boost converter should be about 1.7 times greater than the input phase-to-phase peak voltage (M>1.7; where M=Vout/Vin (peak)) of the boost converter. The high output voltage requirement to attain a low input current THD normally results in an output voltage that is higher than what is generally desired. For example, for an input voltage of 208 Vrms and taking into account the presence of input voltage fluctuations, the output voltage would have to be about 650 volts (significantly higher than a conventional 400 V output) to realize an input current THD of less than 10%. For an input voltage of 440 Vrms, the output voltage would then have to be as high as 1300 volts (far above a conventional 800 volt output) to achieve an input current THD of less than 10%.

Accordingly, what is needed in the art is an improved power converter that overcomes the above described limitations. More specifically, what is needed in the art is a power converter that can achieve a low input current THD and, at the same time, maintain the output voltage of the converter within a preferable range.

SUMMARY OF THE INVENTION

To address the above-discussed deficiencies of the prior art, the present invention provides, for use with a boost converter having a boost inductor couplable to a source of electrical power, a rectifier coupled to the boost inductor and a boost switch coupled across the rectifier, the boost converter operable in discontinuous mode, a circuit for, and method of, providing a reduced output voltage from the boost converter. In one embodiment, the circuit includes an autotransformer, coupled across an output of the boost converter, having an intermediate tap that provides a reduced output voltage at the output.

The present invention therefore introduces the broad concept of employing an autotransformer to reduce the output voltage of a boost converter. The present invention discloses a circuit that achieves the same low input current THD of boost converters with high output voltages and, at the same time, provides an output voltage that is in a preferable range for a particular application.

In one embodiment of the present invention, the circuit further includes an output capacitor, coupled to the intermediate tap. Those skilled in the art are familiar with output capacitors and their function in providing a DC output in boost converters.

In one embodiment of the present invention, the intermediate tap is a center tap of the autotransformer. Alternatively, the intermediate tap may not "bisect" the windings of the autotransformer.

In one embodiment of the present invention, the circuit further includes a snubber circuit, coupled to the boost switch, that clamps a voltage overshoot following the turn-off of the boost switch. In a more specific embodiment, the snubber circuit is a passive snubber circuit. Alternatively, the snubber circuit may be an active snubber circuit.

In one embodiment of the present invention, the autotransformer comprises first and second windings having an equal number of turns. The windings may alternatively differ in numbers of turns. The present invention is not limited to a particular turns-ratio.

In one embodiment of the present invention, the circuit further includes a diode series-coupled with the autotransformer across the output. The diode rectifies power through the autotransformer. Alternatively, an active switch can perform the function if it is desired in a particular application.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
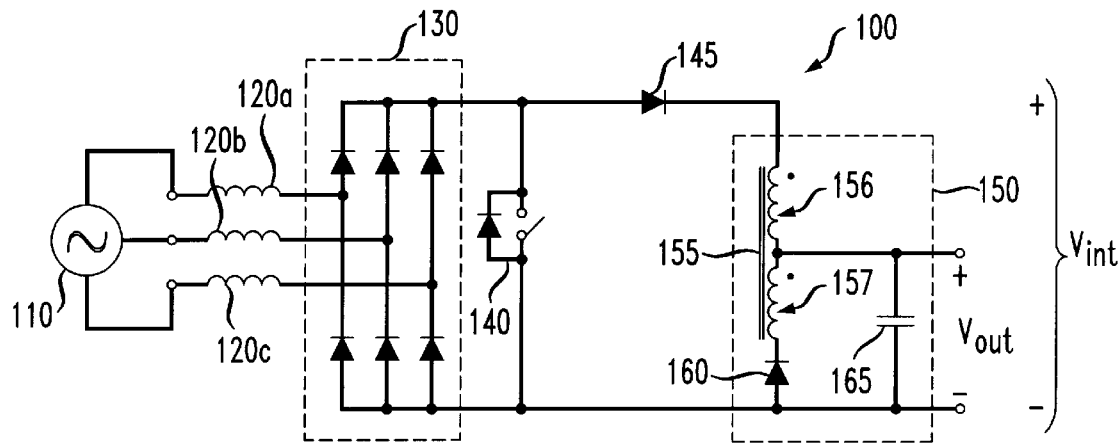
FIG. 1 illustrates a schematic diagram of an embodiment of a three phase boost converter constructed according to the principles of the present invention.

Referring initially to FIG. 1, illustrated is a schematic diagram of an embodiment of a three phase boost converter 100 constructed according to the principles of the present invention. The boost converter 100 receives input power from a three phase voltage source 110 (source of electrical power) through first, second and third boost inductors 120a, 120b, 120c that are coupled to a rectifier 130 including a plurality of diodes arrayed in a full bridge configuration. The rectifier 130 rectifies the three phase AC pulse-width-modulated (PWM) inputs into a DC PWM waveform across a boost switch 140, which allows the use of a unidirectional switch to control all the three phase AC currents. When the boost switch 140 is ON, i.e., conducting, a boost diode 145 is reverse biased, thus isolating the output. When the boost switch is OFF, i.e., not conducting, the diode 145 is forward biased and conducts, delivering power to the output.

As previously discussed, at the beginning of each switching cycle, i.e., when the boost switch 140 is ON, currents through the first, second and third boost inductors 120a, 120b, 120c [when operating in a discontinuous mode or discontinuous current mode (DCM)] begin to ramp up from an initial value of zero at a rate that is proportional to the corresponding phase-to-neutral voltage of the respective boost inductors. Consequently, the average boost inductor currents, which are also the phase currents, are naturally proportional to the corresponding phase voltages during the period when the boost switch 140 is ON.

When the boost switch 140 is OFF, an intermediate voltage Vint which is higher than the peak of the input phase-to-phase voltage (due to the boost action of the boost converter 100) drives the currents through the first, second and third boost inductors 120a, 120b, 120c back to zero prior to the initiation of the next switching cycle. The rate of decrease of current through each inductor, however, is not proportional to its corresponding input phase-to-neutral voltage due to the participation of the output voltage. Consequently, the average inductor currents, during the period when the boost switch 140 is OFF, are also not proportional to the inductor's corresponding phase-to-neutral voltage resulting in distortions in the input phase currents. Therefore, a higher output voltage forces the three phase AC currents to decrease faster, which reduces their contribution to the average input current over a switching cycle thereby resulting in a lower THD.

Again, to achieve an input current THD of less than 10%, the output voltage should be about 1.7 times greater than the input phase-to-phase peak voltage (M>1.7; where M=Vout/Vin(peak)). The high output voltage requirement to achieve a low input current THD normally results in an output voltage that is higher than what is generally preferred. The present invention discloses a circuit that achieves the same low input current THD as in a boost converter with a high output voltage and, at the same time, provides an output voltage Vout in a more preferable range.

At the output stage of the boost converter 100, an output circuit 150 is coupled to the boost diode 145. The output circuit includes an autotransformer 155 that is coupled to a diode 160. Those skilled in the art appreciate that an active switch may be substituted for the diode 160 in other advantageous embodiments. The output voltage Vout is derived from an intermediate tap of the autotransformer 155 forming first and second windings 156, 157 therefrom. In the illustrated embodiment, the intermediate tap is the center tap of the autotransformer 155. It should be noted that in other advantageous embodiments, the intermediate tap may not "bisect" the windings of the autotransformer 155. An output capacitor 165 is coupled across the intermediate tap of the autotransformer 155 and the diode 160 to filter the output voltage Vout.

To illustrate the operation of the output stage of the boost converter 100, assume an equal, i.e., 1:1, turns-ratio for the windings, 156, 157 of the autotransformer 155 and that the intermediate voltage Vint is selected to be at a value just slightly higher than the peak value of the input phase-to-phase voltage (which is the minimum possible voltage with any type of boost converter). When the boost switch 140 is turned OFF, the intermediate voltage Vint which is used to discharge the first, second and third inductors 120a, 120b, 120c is twice the output voltage Vout (assuming negligible voltage drops across the diode 160). The intermediate voltage Vint, at twice the value of the output voltage Vout, provides an acceptable M value (for instance, greater than two) thereby preserving the low input current THD feature of the boost converter 100. Moreover, the output voltage Vout is in a more preferable range for the device being powered by the boost converter 100.

Although an autotransformer with turns-ratio of 1:1 has been described, autotransformers with different turns-ratio may be employed provided that the output voltage Vout is greater than the peak of the phase-to-phase input voltage. This condition will provide sufficient time to reset the core of the autotransformer. Thus, the boost converter 100 preserves the low input current THD and provides a desired output voltage Vout.

Figure 2:
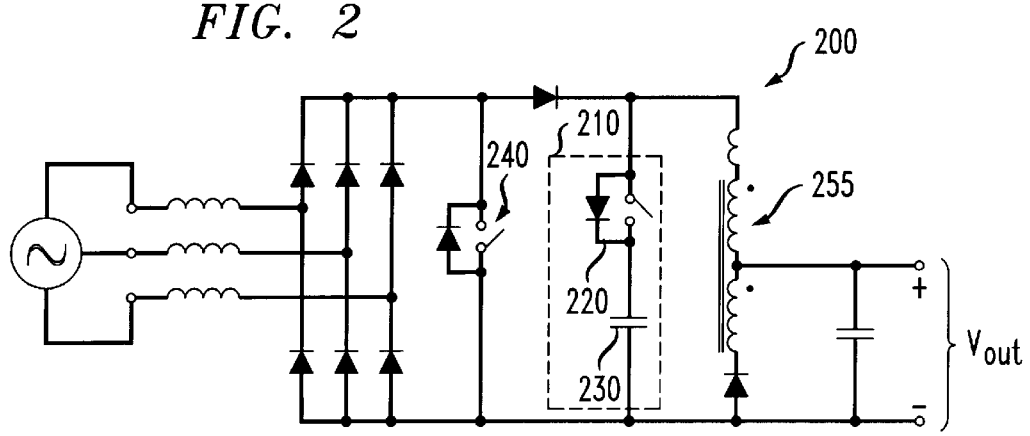
FIG. 2 illustrates a schematic diagram of another embodiment of a three phase boost converter constructed according to the principles of the present invention.

Turning now to FIG. 2, illustrated is a schematic diagram of another embodiment of a boost converter 200 constructed according to the principles of the present invention. In addition to the components as illustrated and described with respect to FIG. 1, the boost converter 200 includes an active lossless snubber circuit 210. The active lossless snubber circuit 210 includes an auxiliary switch 220 series-coupled with a snubber capacitor 230.

The snubber circuit 210 clamps voltage "overshoot" transients across a boost switch 240, due to leakage inductances of an autotransformer 255, when the boost switch 240 is turned OFF. The snubber reduces the stresses on the boost switch 240 during switching intervals and transients due to the "clamp" function provided by the internal body diode of the auxiliary switch 220. To release the energy in the snubber capacitor 230, the auxiliary switch 220 may be closed, almost anytime, for a certain period. One common practice is to close the auxiliary switch 220 immediately after the boost switch 240 is turned OFF. The active snubber circuit 210 is well known in the art and, hence, the operation will not hereinafter be described in detail.

Figure 3:
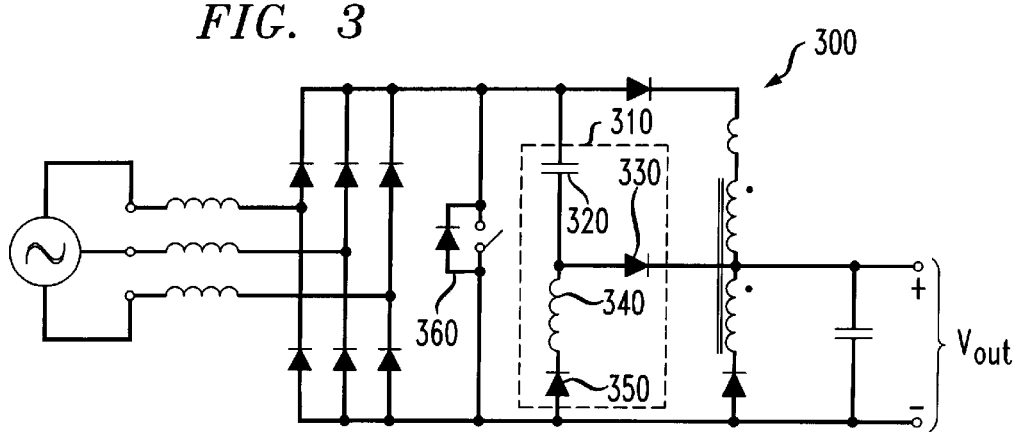
FIG. 3 illustrates a schematic diagram of another embodiment of a three phase boost converter constructed according to the principles of the present invention.

Turning now to FIG. 3, illustrated is a schematic diagram of another embodiment of a boost converter 300 constructed according to the principles of the present invention. In addition to the components as illustrated and described with respect to FIG. 1, the boost converter 300 includes a passive lossless snubber circuit 310. The passive lossless snubber circuit 310 includes a capacitor 320 that is series-coupled to an inductor 340 and a diode 350 across a boost switch 360. Also illustrated in the passive lossless snubber circuit is a diode 330 that is coupled to the output of the converter 300. The passive snubber circuit 310 is also well known in the art and, hence, the operation will not hereinafter be described in detail.

While specific embodiments of a power converter and a circuit and method for reducing a voltage at an output thereof have been illustrated and described, other embodiments are well within the broad scope of the present invention. For a better understanding of snubber circuits and their application in switching power converters, in general, see "Principles of Power Electronics" by John G. Kassakian, et al., Addison Wesley, Inc. (1991), which is incorporated herein by reference.

Although the present invention has been described in detail, those skilled in the art should understand that they can make various changes, substitutions and alterations herein without departing from the spirit and scope of the invention in its broadest form.

What is claimed is:

1. For use with a boost converter having a boost inductor couplable to a source of electrical power, a rectifier coupled to said boost inductor and a boost switch coupled across said rectifier, said boost converter operable in discontinuous mode, a circuit, comprising:

an autotransformer coupled across an output of said boost converter and having an intermediate tap that provides a reduced output voltage, said boost converter adapted to achieve a low input current total harmonic distortion at said reduced output voltage.

2. The circuit as recited in claim 1 further comprising an output capacitor coupled to said intermediate tap.

3. The circuit as recited in claim 1 wherein said intermediate tap is a center tap of said autotransformer.

4. The circuit as recited in claim 1 further comprising a snubber circuit coupled to said boost switch.

5. The circuit as recited in claim 4 wherein said snubber circuit is a passive lossless snubber circuit.

6. The circuit as recited in claim 1 wherein said autotransformer comprises first and second windings having an equal number of turns.

7. The circuit as recited in claim 1 further comprising a diode series-coupled with said autotransformer across said output.

8. For use with a boost converter having a boost inductor couplable to a source of electrical power, a rectifier coupled to said boost inductor and a boost switch coupled across said rectifier, said boost converter operable in discontinuous mode, a method of providing a reduced output voltage from said boost converter, comprising:

receiving input power from said source of electrical power; and deriving said reduced output voltage from an intermediate tap of an autotransformer coupled across an output of said boost converter, said boost converter adapted to achieve a low input current total harmonic distortion at said reduced output voltage.

9. The method as recited in claim 8 further comprising filtering said output voltage with an output capacitor coupled to said intermediate tap.

10. The method as recited in claim 8 wherein said intermediate tap is a center tap of said autotransformer.

11. The method as recited in claim 8 further comprising clamping a voltage overshoot of said boost switch.

12. The method as recited in claim 11 wherein said clamping is performed by a snubber circuit.

13. The method as recited in claim 8 wherein said autotransformer comprises first and second windings having an equal number of turns.

14. The method as recited in claim 8 further comprising series-coupling a diode with said autotransformer across said output.

15. A boost converter operable in a discontinuous mode, comprising:

a plurality of boost inductors that receive an input voltage from a source of electrical power;

a three phase rectifier coupled to said plurality of boost inductors;

a boost switch, coupled across said rectifier, that facilitates a transfer of energy to an output of said boost converter;

a boost diode, coupled to said boost switch, that isolates said output when said boost switch is conducting; and an autotransformer coupled across said output and having an intermediate tap that provides a reduced output voltage, said boost converter adapted to achieve a low input current total harmonic distortion at said reduced output voltage.

16. The boost converter as recited in claim 15 further comprising an output capacitor coupled to said intermediate tap.

17. The boost converter as recited in claim 15 wherein said intermediate tap is a center tap of said autotransformer.

18. The boost converter as recited in claim 15 further comprising a snubber circuit coupled to said boost switch.

19. The boost converter as recited in claim 18 wherein said snubber circuit is a passive lossless snubber circuit.

20. The boost converter as recited in claim 15 wherein said autotransformer comprises first and second windings having an equal number of turns.

21. The boost converter as recited in claim 15 further comprising a diode series-coupled with said autotransformer across said output.

\* \* \* \* \*